(12) United States Patent
Kawase et al.

(10) Patent No.: US 11,746,958 B2
(45) Date of Patent: Sep. 5, 2023

(54) HIGH PRESSURE CONTAINER SYSTEM AND FUEL CELL VEHICLE

(71) Applicant: HONDA MOTOR CO., LTD., Tokyo (JP)

(72) Inventors: Satoru Kawase, Wako (JP); Koichi Takaku, Wako (JP); Kazuyuki Kadowaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 688 days.

(21) Appl. No.: 16/744,234

(22) Filed: Jan. 16, 2020

(65) Prior Publication Data
US 2020/0232603 A1 Jul. 23, 2020

(30) Foreign Application Priority Data

Jan. 21, 2019 (JP) .................................. 2019-007573

(51) Int. Cl.
*F17C 13/02* (2006.01)
*G05D 16/02* (2006.01)
(Continued)

(52) U.S. Cl.
CPC ............ *F17C 13/025* (2013.01); *B60K 15/03* (2013.01); *G05D 16/02* (2013.01); *G05D 16/028* (2019.01);
(Continued)

(58) Field of Classification Search
CPC ............. H01M 8/04753; F17C 13/025; G05D 16/028; G05D 16/02; B60K 15/03
See application file for complete search history.

(56) References Cited

U.S. PATENT DOCUMENTS

| 2017/0250421 A1* | 8/2017 | Saito | ...................... B60L 58/30 |
| 2018/0269499 A1* | 9/2018 | Saito | ................ H01M 8/04955 |
| 2020/0091525 A1* | 3/2020 | Fujita | ................ H01M 8/04373 |

FOREIGN PATENT DOCUMENTS

| JP | 2007-048519 | 2/2007 |
| JP | 2018-152314 | 9/2018 |

(Continued)

OTHER PUBLICATIONS

Machine Translation of WO-0186195-A1 (Dec. 15, 2022) (Year: 2022).*

(Continued)

*Primary Examiner* — Matthew J Merkling
(74) *Attorney, Agent, or Firm* — AMIN, TUROCY & WATSON, LLP (57) ABSTRACT

A high pressure container system is equipped with an upstream side pressure sensor that measures an internal pressure of high pressure containers upstream of a pressure regulating valve, a plurality of downstream side pressure sensors that measure the pressure of the fluid downstream of the pressure regulating valve, and a control device. At a normal time of the downstream side pressure sensors, a control device monitors the internal pressure of the high pressure containers on the basis of the measured values of the downstream side pressure sensors, and at an abnormal time when any one of the downstream side pressure sensors is abnormal, the control device monitors the internal pressure of the high pressure containers on the basis of the measured values of the downstream side pressure sensors, and the measured value of the upstream side pressure sensor.

15 Claims, 5 Drawing Sheets

(51) Int. Cl.
  *G05D 16/00*  (2006.01)
  *B60K 15/03*  (2006.01)
  *H01M 8/04746*  (2016.01)
  *B60L 50/71*  (2019.01)

(52) U.S. Cl.
  CPC .............. *H01M 8/04753* (2013.01); *B60K 2015/03315* (2013.01); *B60L 50/71* (2019.02); *B60Y 2400/306* (2013.01)

(56) References Cited

FOREIGN PATENT DOCUMENTS

| | | | | |
|---|---|---|---|---|
| JP | 2019102374 A | * | 6/2019 | ........ H01M 8/04089 |
| KR | 20180095984 A | * | 8/2018 | |
| WO | WO-0186195 A1 | * | 11/2001 | ............ F17C 11/005 |

OTHER PUBLICATIONS

Machine Translation of KR-20180095984-A (Dec. 15, 2022) (Year: 2022).*

Japanese Office Action for Japanese Patent Application No. 2019-007573 dated Nov. 4, 2020.

* cited by examiner

HIGH PRESSURE CONTAINER SYSTEM AND FUEL CELL VEHICLE

CROSS-REFERENCE TO RELATED APPLICATION

This application is based upon and claims the benefit of priority from Japanese Patent Application No. 2019-007573 filed on Jan. 21, 2019, the contents of which are incorporated herein by reference.

BACKGROUND OF THE INVENTION

Field of the Invention

The present invention relates to a high pressure container system and a fuel cell vehicle equipped therewith, in which a fluid accommodated in a high pressure container is supplied to a downstream side via a pressure regulating valve.

Description of the Related Art

For example, as disclosed in Japanese Laid-Open Patent Publication No. 2007-048519, a high pressure container system is known in which a fluid accommodated within a high pressure container is supplied to a downstream side via a pressure regulating valve. The high pressure container system is equipped with a first pressure sensor that measures a pressure of a fluid downstream of the pressure regulating valve, and a second pressure sensor that measures the pressure of the fluid at an inlet of a supply target for the fluid (a fuel cell) that is disposed downstream of the first pressure sensor.

On the basis of measured values of the first pressure sensor and the second pressure sensor which are arranged in the manner described above, a target pressure value downstream of the pressure regulating valve is set while a pressure loss or the like from the pressure regulating valve to the inlet of the fuel cell is taken into consideration. In addition, by controlling the pressure regulating valve so as to take such a target pressure value, a fluid having an appropriate pressure is supplied to the fuel cell.

In such a high pressure container system, in the case that an abnormality of the second pressure sensor is detected, the pressure regulating valve is controlled by estimating the target pressure value in accordance with a calculation from the measured value of the first pressure sensor, and without using the measured value of the second pressure sensor. Therefore, even if the second pressure sensor experiences a failure, operations can be continued without stopping the high pressure container system.

SUMMARY OF THE INVENTION

In the above-described high pressure container system, operations thereof are continued by estimating the measured value of the second pressure sensor in which an abnormality has been detected from the measured value of the first pressure sensor that is operating normally, and the second pressure sensor is not made redundant. However, when measured in such a manner, it is difficult to say that operations based on measured values that are estimated, which are not actual measured values, are sufficiently reliable. Therefore, according to the above-described high pressure container system, in the case that an abnormality of the pressure sensor is detected, it is infeasible to continue operations without causing a decrease in reliability.

The present invention has been devised with the aim of solving the aforementioned problems, and has the object of providing a high pressure container system and a fuel cell vehicle equipped therewith, in which, even in the case that an abnormality of a pressure sensor is detected, operations can be continued while reliability is maintained.

One aspect of the present invention is characterized by a high pressure container system configured to supply a fluid accommodated in a high pressure container to a downstream side via a pressure regulating valve, the high pressure container system comprising an upstream side pressure sensor configured to measure an internal pressure of the high pressure container upstream of the pressure regulating valve, a plurality of downstream side pressure sensors configured to measure the pressure of the fluid downstream of the pressure regulating valve, and a control device configured to monitor that the internal pressure of the high pressure container does not fall below a lower limit set value, when the internal pressure of the high pressure container decreases until reaching a pressure of the fluid downstream of the pressure regulating valve, wherein the control device includes an abnormality detection unit configured to detect an abnormality of the downstream side pressure sensors, and at a normal time when an abnormality of the downstream side pressure sensors is not detected, the control device monitors the internal pressure of the high pressure container on the basis of the measured values of the downstream side pressure sensors, whereas at an abnormal time when it is detected that any one of the downstream side pressure sensors is abnormal, the control device monitors the internal pressure of the high pressure container on the basis of the measured values of the downstream side pressure sensors, and the measured value of the upstream side pressure sensor.

Another aspect of the present invention is characterized by a high pressure container system configured to supply a fluid accommodated in a high pressure container to a downstream side via a pressure regulating valve, the high pressure container system comprising an upstream side pressure sensor configured to measure an internal pressure of the high pressure container upstream of the pressure regulating valve in order to calculate at least a remaining amount of fluid inside the container, two downstream side pressure sensors configured to measure the pressure of the fluid downstream of the pressure regulating valve, and a control device configured to monitor that the internal pressure of the high pressure container does not fall below a lower limit set value, when the internal pressure of the high pressure container decreases until reaching a pressure of the fluid downstream of the pressure regulating valve, wherein the control device includes an abnormality detection unit configured to detect an abnormality of either one of the two downstream side pressure sensors, and at a normal time when an abnormality of the two downstream side pressure sensors is not detected, the control device monitors the internal pressure of the high pressure container using the measured values of the two downstream side pressure sensors, whereas at an abnormal time when it is detected that either one of the two downstream side pressure sensors is abnormal, the control device monitors the internal pressure of the high pressure container using the measured value of at least one of the two downstream side pressure sensors, and the measured value of the upstream side pressure sensor.

Another aspect of the present invention is characterized by a fuel cell vehicle equipped with the above-described high pressure container system.

When the internal pressure of the high pressure container decreases and falls below the pressure regulated lower limit value of the pressure regulating valve, the internal pressure of the high pressure container and the fluid downstream from the pressure regulating valve become the same pressure. Therefore, the internal pressure of the high pressure container within a low pressure region can be measured with redundancy by the plurality of downstream side pressure sensors that are disposed downstream from the pressure regulating valve. Stated otherwise, at a normal time when an abnormality of the downstream side pressure sensors is not detected, the internal pressure of the high pressure container can be monitored in a state in which reliability is high, on the basis of the measured values of the downstream side pressure sensors.

Further, at an abnormal time when an abnormality is detected in any one of the downstream side pressure sensors, in the manner described above, the downstream side pressure sensor is made redundant, owing to the presence of the upstream side pressure sensor, which is disposed separately from the downstream side pressure sensors and upstream of the pressure regulating valve in order to measure the internal pressure of the high pressure container. More specifically, even when there is an abnormality, the internal pressure of the high pressure tank can be measured while redundancy of the system is maintained. In this manner, on the basis of the actual measured values of the downstream side pressure sensors and the upstream side pressure sensor, the internal pressure of the high pressure container can be continuously monitored in a state in which reliability is high.

Therefore, according to the present invention, even in the case that an abnormality of a pressure sensor is detected, operations of the high pressure container system can be continued while reliability is maintained.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a high pressure container system and a fuel cell vehicle according to the present invention will be presented and described in detail below with reference to the accompanying drawings. In the drawings discussed below, structural elements exhibiting the same or similar functions and effects are denoted by the same reference numerals, and repeated description of such components may be omitted.

Figure 1:
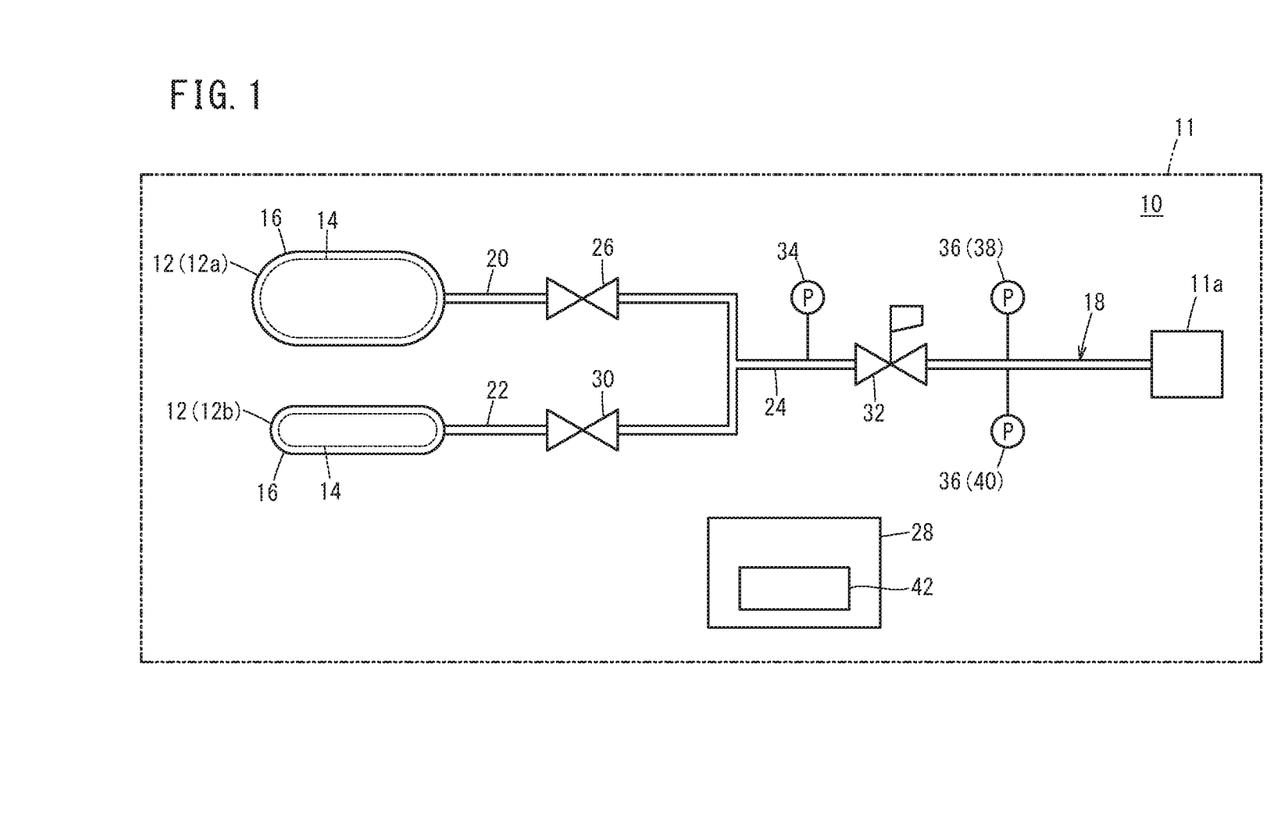
FIG. 1 is a schematic configuration diagram of a high pressure container system and a fuel cell vehicle according to an embodiment of the present invention.

As shown in FIG. 1, the high pressure container system 10 according to the present embodiment is mounted, for example, on a mounting body in the form of a fuel cell vehicle 11, and is capable of being used appropriately as a system equipped with high pressure containers 12 (high pressure tanks) in which hydrogen gas that is supplied to a fuel cell 11a is accommodated. Thus, according to the present embodiment, although a description will be given concerning an example in which the mounting body is regarded as being the fuel cell vehicle 11, and the high pressure containers 12 accommodate hydrogen gas as a fluid, the present invention is not particularly limited to this example. The high pressure container system 10 may be mounted on a mounting body other than the fuel cell vehicle 11, and a fluid other than hydrogen gas can be accommodated in the high pressure containers 12.

Further, according to the present embodiment, as the high pressure containers 12, the high pressure container system 10 is provided with two high pressure containers, namely, a first high pressure container 12a and a second high pressure container 12b having different capacities. However, the high pressure container system 10 may be provided with only one high pressure container 12, or may be provided with three or more high pressure containers 12. In the case of being provided with a plurality of high pressure containers 12, the capacities thereof may be the same, or the capacities may differ from each other. Moreover, hereinafter, the first high pressure container 12a and the second high pressure container 12b will also be referred to collectively as "high pressure containers 12".

Each of the high pressure containers 12 includes a liner 14 made of resin being a hollow body into which hydrogen gas is supplied to or discharged from the interior thereof, and a reinforced layer 16 made of a fiber-reinforced plastic covering an outer surface of the liner 14. Stated otherwise, the internal pressure of the high pressure containers 12 is indicative of the pressure of the hydrogen gas accommodated in the interior of the liners 14. In the high pressure container system 10, the high pressure containers 12 and the fuel cell 11a are provided so as to be capable of communicating with each other through a discharge flow passage 18. The discharge flow passage 18 is constituted, for example, by a first pipe 20 into which hydrogen gas discharged from the first high pressure container 12a flows, a second pipe 22 into which hydrogen gas discharged from the second high pressure container 12b flows, and a confluence pipe 24 that allows the hydrogen gases from the first pipe 20 and the second pipe 22 to merge, and guides the merged hydrogen gases to the fuel cell 11a which is located on the downstream side.

A first main stop valve 26 is interposed within the first pipe 20. By opening or closing the first main stop valve 26 by way of a control device 28 which controls the high pressure container system 10, it is possible to switch between a state in which the discharge flow passage 18 and the interior of the first high pressure container 12a are placed in communication and a state in which the communication is interrupted. Similarly, the second main stop valve 30 is interposed within the second pipe 22, and by opening or closing the second main stop valve 30 by way of the control device 28, it is possible to switch between a state in which the discharge flow passage 18 and the interior of the second high pressure container 12b are placed in communication and a state in which the communication is interrupted.

The confluence pipe 24 communicates with the downstream side of the first main stop valve 26 of the first pipe 20, and with the downstream side of the second main stop valve 30 of the second pipe 22. Further, in the confluence pipe 24, a pressure regulating valve 32 is interposed therein by which the hydrogen gas, which is discharged from the high pressure containers 12 into the discharge flow passage 18 via the first main stop valve 26 and the second main stop valve 30 that are in an open state, is lowered in pressure and delivered to the downstream side. In other words, the pressure of the hydrogen gas upstream of the pressure regulating valve 32 corresponds to the internal pressure of the high pressure containers 12 (the remaining amount of hydrogen gas inside the high pressure containers 12). When the pressure of the hydrogen gas upstream of the pressure regulating valve 32 is greater than a value suitable for being supplied to the fuel cell 11a, the pressure regulating valve 32 reduces the pressure of the hydrogen gas, and thereby sets it to a suitable value for being supplied to the fuel cell 11a. Further, when the internal pressure of the high pressure containers 12 is reduced by the pressure regulating valve 32 until reaching the pressure regulated lower limit value, the pressures on the upstream and downstream sides of the pressure regulating valve 32 coincide with each other.

An upstream side pressure sensor 34 is provided at a location further upstream of the confluence pipe 24 than the pressure regulating valve 32. As noted previously, the pressure of the hydrogen gas upstream of the pressure regulating valve 32 corresponds to the internal pressure of the high pressure containers 12. Therefore, the upstream side pressure sensor 34 is capable of measuring, as the internal pressure of the high pressure containers 12, the pressure of the hydrogen gas upstream of the pressure regulating valve 32. The upstream side pressure sensor 34 can be used, for example, to indicate the remaining amount of hydrogen gas (the remaining amount of fluid inside the containers) within the high pressure containers 12 with respect to a vehicle occupant of the fuel cell vehicle 11 or the like. Further, the upstream side pressure sensor 34 has a comparatively large measurement range, so as to be capable of measuring the internal pressure of the high pressure containers 12 which are fully filled, for example, to an amount of 70 MPa or the like.

A plurality of mutually redundant downstream side pressure sensors 36 are provided at a location further downstream of the confluence pipe 24 than the pressure regulating valve 32. According to the present embodiment, the plurality of downstream side pressure sensors 36 are constituted from two individual components made up from a first downstream side pressure sensor 38 and a second downstream side pressure sensor 40. However, the present invention is not particularly limited to this feature, and may be constituted from three or more of such components. Hereinafter, when the first downstream side pressure sensor 38 and the second downstream side pressure sensor 40 are not particularly distinguished from each other, they may also be collectively referred to as "downstream side pressure sensors 36".

In the case that the internal pressure of the high pressure containers 12 is greater than the pressure regulated lower limit value by the pressure regulating valve 32, the downstream side pressure sensors 36 are made to measure the pressure of the hydrogen gas which is regulated by the pressure regulating valve 32. On the other hand, in the case that the internal pressure of the high pressure containers 12 is reduced by the pressure regulating valve 32 until reaching the pressure regulated lower limit value, the downstream side pressure sensors 36 are capable of measuring, as the internal pressure of the high pressure containers 12, the pressure of the hydrogen gas further downstream of the pressure regulating valve 32. Stated otherwise, the downstream side pressure sensors 36 measure the internal pressure of the high pressure containers 12 in a low pressure region which is smaller than the pressure regulated lower limit value of the pressure regulating valve 32. Therefore, the measurement range of the downstream side pressure sensors 36 is preferably set to be smaller than the measurement range of the upstream side pressure sensor 34, so as to be capable of measuring with high accuracy the internal pressure of the high pressure containers 12 in a low pressure region, for example, on the order of 0.5 to 1.5 MPa or the like.

The control device 28 is configured as a computer equipped with a CPU and memories, etc., none of which are shown, and monitors that the internal pressure of the high pressure containers 12 does not fall below the lower limit set value. The lower limit set value is a necessary minimum residual pressure of the high pressure containers 12, and the reliability of the high pressure containers 12 can be maintained by being managed so that the internal pressure of the high pressure containers 12 does not fall below the lower limit set value.

In the case that, as noted previously, each of the high pressure containers 12 includes the resin liner 14 and the reinforced layer 16, the hydrogen gas accommodated inside the liner 14 may penetrate through the liner 14 and enter into an interval or the like (hereinafter also referred to as a covered portion) between the liner 14 and the reinforced layer 16. In a state in which the fluid accumulates and remains in the covered portion, when the internal pressure of the (liner 14 of the) high pressure containers 12 is reduced and becomes smaller than the internal pressure of the covered portion, there is a concern that the liner 14 and the reinforced layer 16 may peal off or separate from one another, and the liner 14 may undergo buckling or the like to protrude toward the interior thereof. Thus, for example, a minimum value of the internal pressure of the high pressure containers 12, which is capable of maintaining a state in which the aforementioned peeling and buckling can be suppressed, is preferably set as the lower limit set value.

The control device 28 includes an abnormality detection unit 42 that detects an abnormality of the downstream side pressure sensors 36. Further, at a normal time when an abnormality of the downstream side pressure sensors 36 is not detected by the abnormality detection unit 42, the control device 28 monitors with redundancy the internal pressure of the high pressure containers 12, on the basis of the measured value of the first downstream side pressure sensor 38 and the measured value of the second downstream side pressure sensor 40. Moreover, hereinafter, the measured value of the first downstream side pressure sensor 38 may also be referred to as a "first measured value", the measured value of the second downstream side pressure sensor 40 may also be referred to as a "second measured value", and the first measured value and the second measured value may be collectively referred to as "downstream side measured values".

Figure 2:
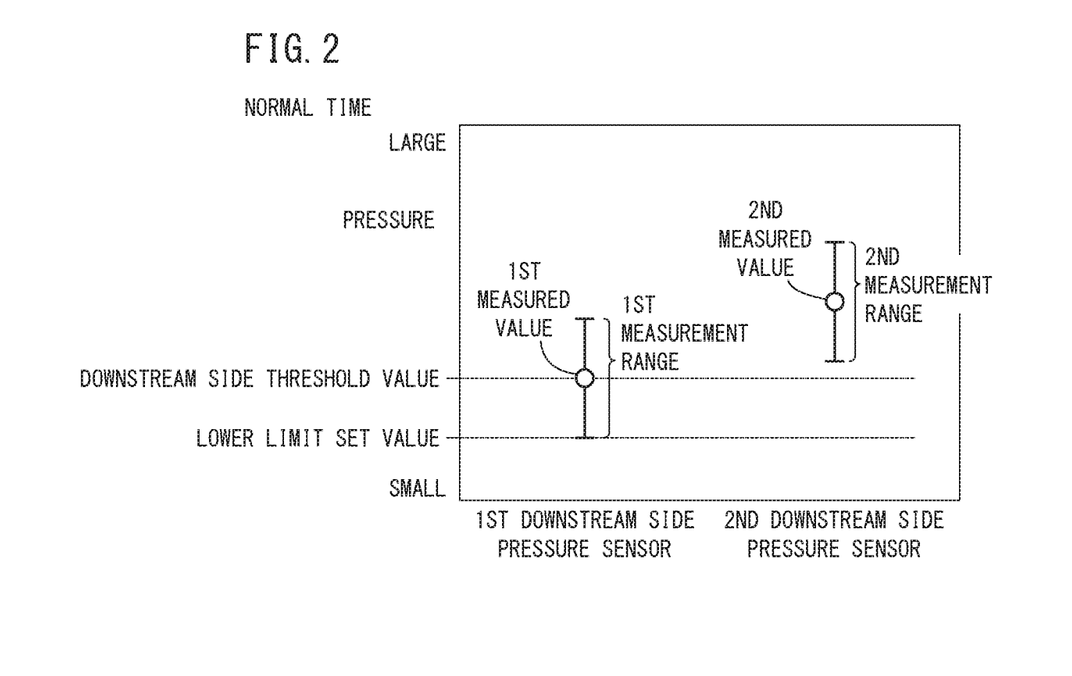
FIG. 2 is an explanatory diagram for describing relationships between downstream side measured values, a downstream side threshold value, and a lower limit set value at a normal time when the downstream side pressure sensors are normal.

More specifically, as shown in FIG. 2, the control device 28 compares each of the first measured value and the second measured value with a downstream side threshold value, and if at least one of the first measured value and the second measured value is less than or equal to the downstream side threshold value, a determination is made that a stop timing has occurred at which discharging of the fluid from the high pressure containers 12 is to be stopped. It should be noted that, in FIG. 2, a case is illustrated in which the first measured value is less than or equal to the downstream side threshold value.

The downstream side threshold value is preferably set to be greater than the aforementioned lower limit set value, by a size corresponding to the measurement error range of the downstream side pressure sensors 36. More specifically, assuming that a range, in which a measurement error of the downstream side pressure sensors 36 is included within the downstream side measured values, is regarded as a "downstream side measurement range", the downstream side threshold value, for example, can be a value obtained by adding a value of downstream side measurement range/2 to the lower limit set value.

Figure 3:
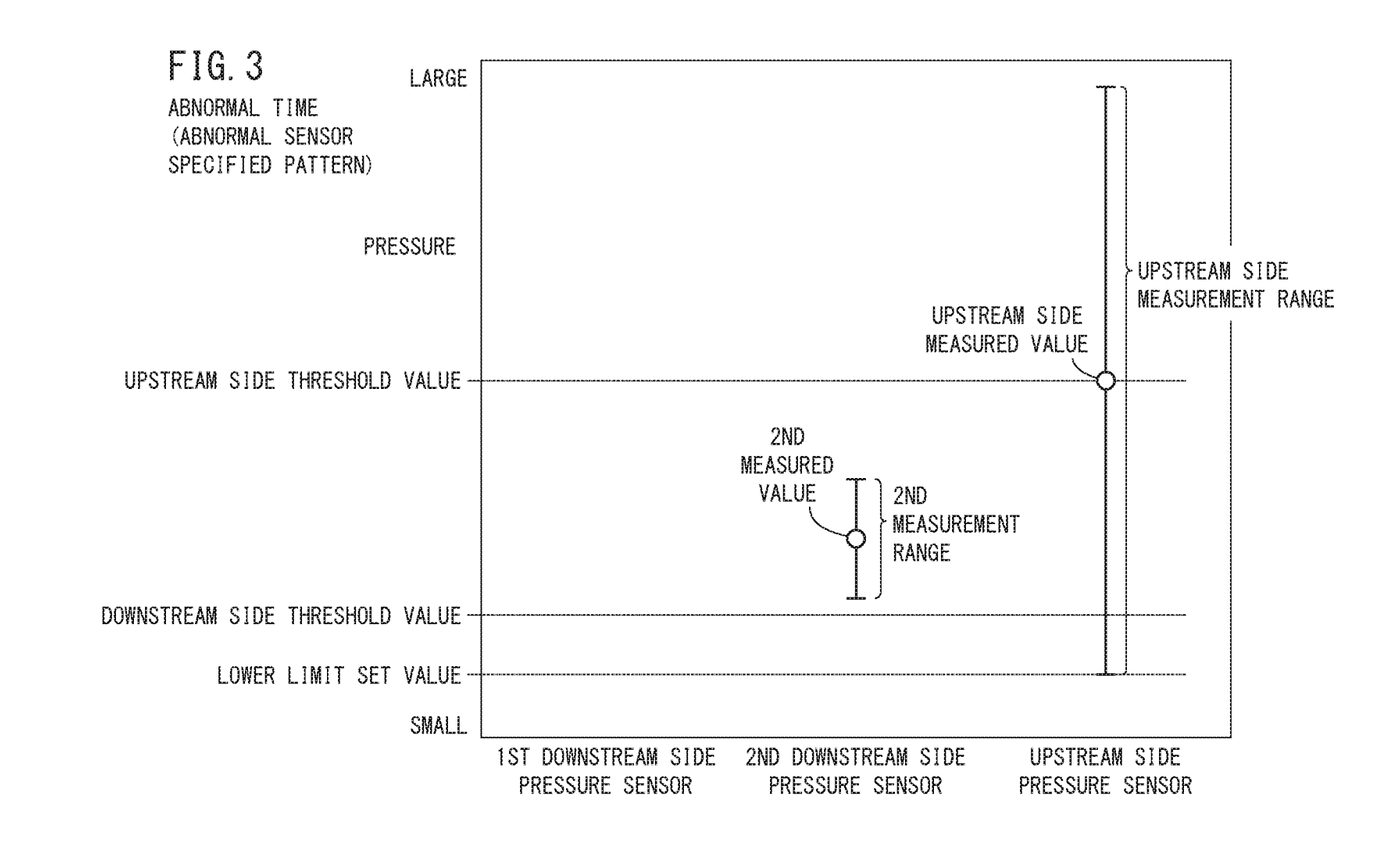
FIG. 3 is an explanatory diagram for describing relationships between a second measured value, a downstream side threshold value, an upstream side measured value, an upstream side threshold value, and a lower limit set value, in the case it is determined that a first downstream side pressure sensor is abnormal.
Figure 4:
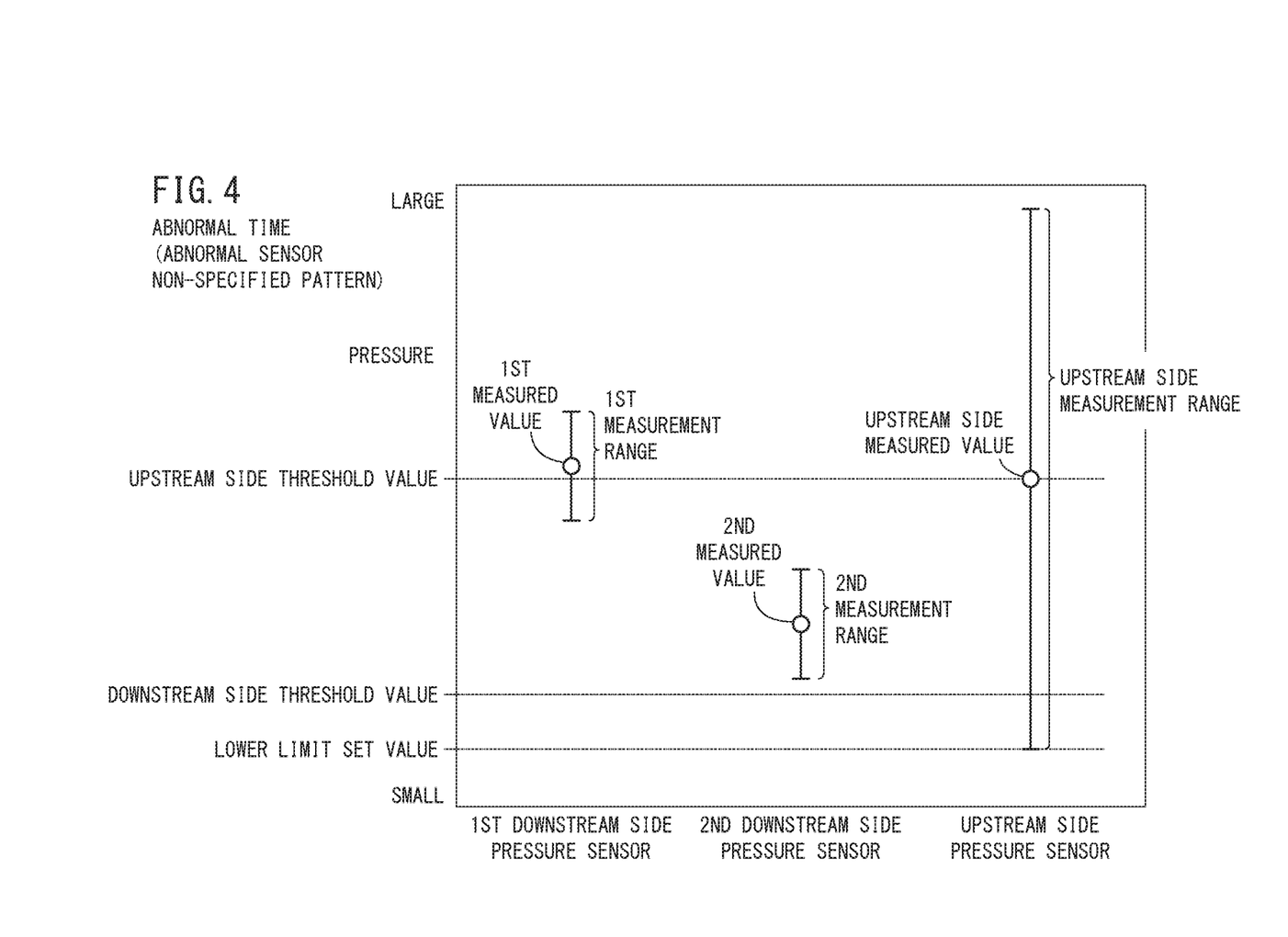
FIG. 4 is an explanatory diagram for describing relationships between downstream side measured values, a downstream side threshold value, an upstream side measured value, an upstream side threshold value, and a lower limit set value, in the case it is determined that any one of the downstream side pressure sensors is abnormal.

On the other hand, the control device 28 makes the downstream side pressure sensors 36 redundant by way of the upstream side pressure sensor 34, when it is detected by the abnormality detection unit 42 that any one of the downstream side pressure sensors 36 is abnormal. More specifically, as shown in FIGS. 3 and 4, the control device 28 monitors the internal pressure of the high pressure containers 12, on the basis of the downstream side measured values, and the measured value of the upstream side pressure sensor 34 (hereinafter also referred to as an "upstream side measured value").

In greater detail, in the case that an input from either one of the first downstream side pressure sensor 38 or the second downstream side pressure sensor 40 with respect to the control device 28 has become abnormal due to, for example, a circuit breakage or short circuiting, the abnormality detection unit 42 detects that the concerned downstream side pressure sensor 36 is abnormal. In this case, among the first downstream side pressure sensor 38 and the second downstream side pressure sensor 40, one which has developed an abnormal input with respect to the control device 28 can be identified as a downstream side pressure sensor 36 in which an abnormality has occurred, and therefore, the abnormality detection unit 42 determines the presence of an abnormal sensor specified pattern. It should be noted that, in FIG. 3, an example is illustrated in which the input from the first downstream side pressure sensor 38 becomes abnormal, and the first measured value cannot be obtained in a normal manner.

Further, even in the case that the inputs from the downstream side pressure sensors 36 with respect to the control device 28 are not abnormal, for example, in the case that a difference between the first measured value and the second measured value has become greater than a predetermined value, the abnormality detection unit 42 detects that the downstream side pressure sensors 36 are abnormal. In this case, for example, although it is conceivable that at least one of drifting and offset have occurred in either one of the first measured value or the second measured value, since it is not specified whether the abnormality has occurred in either one of the first downstream side pressure sensor 38 and the second downstream side pressure sensor 40, the abnormality detection unit 42 determines the presence of an abnormal sensor non-specified pattern.

Incidentally, due to individual differences between the downstream side pressure sensors 36, even if the first measured value and the second measured value are values that are output at a normal time, a slight difference may occur between such values. Thus, in the abnormality detection unit 42, for example, as shown in FIG. 2, in the case that at least portions of the first measurement range, in which the measurement error range of the first downstream side pressure sensor 38 is included within the first measurement value, and the second measurement range, in which the measurement error range of the second downstream side pressure sensor 40 is included within the second measurement value, overlap with each other, the downstream side pressure sensors 36 are determined to be operating normally.

On the other hand, for example, as shown in FIG. 4, in the case that the entirety of the first measurement range and the second measurement range do not overlap with each other, the abnormality detection unit 42 determines that an abnormality of a non-specified pattern has occurred. In this case, the predetermined value of the aforementioned difference for detecting the abnormality can be regarded as {(first measurement range/2)+(second measurement range/2)}.

In the case that the abnormality detection unit 42 has determined the presence of the abnormal sensor specified pattern in the manner described above, the control device 28 compares the measured values of the remaining downstream side pressure sensors 36 excluding the downstream side pressure sensor 36 that was identified as being abnormal with the downstream side threshold value, together with monitoring the internal pressure of the high pressure containers 12 with redundancy by comparing the measured value of the upstream side pressure sensor 34 with the upstream side threshold value.

More specifically, as shown in FIG. 3, in the case that the abnormality detection unit 42 has detected that the first downstream side pressure sensor 38 is abnormal, the second measured value of the second downstream side pressure sensor 40 is compared with the downstream side threshold value, together with comparing the upstream side measured value with the upstream side threshold value. In addition, when the second measured value is less than or equal to the downstream side threshold value, or when the upstream side measured value is less than or equal to the upstream side threshold value, a determination is made that the stop timing has occurred at which discharging of the fluid from the high pressure containers 12 is to be stopped. It should be noted that, in FIG. 3, a case is illustrated in which the upstream side measured value is less than or equal to the upstream side threshold value.

The upstream side threshold value is preferably set to be greater than the aforementioned lower limit set value, by a size corresponding to the measurement error range of the upstream side pressure sensor 34. More specifically, assuming that a range, in which a measurement error of the upstream side pressure sensor 34 is included within the upstream side measured value, is regarded as an "upstream side measurement range", the upstream side threshold value, for example, can be a value obtained by adding a value of upstream side measurement range/2 to the lower limit set value. As noted previously, since the measurement range of the upstream side pressure sensor 34 is larger than the measurement range of the downstream side pressure sensors 36, the measurement error range also becomes larger in the upstream side pressure sensor 34 than in the downstream side pressure sensors 36. Therefore, the upstream side measurement range is greater than the downstream side measurement range, and the upstream side threshold value is greater than the downstream side threshold value.

In the case that the abnormality detection unit 42 has determined the presence of the abnormal sensor non-specified pattern in the manner described above, the control device 28 compares the measured values of all of the downstream side pressure sensors 36 with the downstream side threshold value, together with monitoring the internal pressure of the high pressure containers 12 with redundancy by comparing the measured value of the upstream side pressure sensor 34 with the upstream side threshold value.

More specifically, as shown in FIG. 4, both the first measured value and the second measured value are compared with the downstream side threshold value, together with the upstream side measured value being compared with the upstream side threshold value. In addition, when either one of the first measured value and the second measured value is less than or equal to the downstream side threshold value, or when the upstream side measured value is less than or equal to the upstream side threshold value, a determination is made that the stop timing has occurred at which discharging of the fluid from the high pressure containers 12 is to be stopped. It should be noted that, in FIG. 4, a case is illustrated in which the upstream side measured value is less than or equal to the upstream side threshold value.

In the case that the control device 28 has determined that the stop timing has occurred, the control device 28 places the first main stop valve 26 and the second main stop valve 30 in a closed state, and avoids further decreasing the internal pressure of the high pressure containers 12. Consequently, in the high pressure container system 10, the internal pressure of the high pressure containers 12 can be managed so as not to fall below the lower limit set value.

The high pressure container system 10 according to the present embodiment is basically configured in the manner described above. Hydrogen gas is filled in the interior of the high pressure containers 12 (liners 14) via a non-illustrated hydrogen supply source and a supply flow passage. Further, in the case that the hydrogen gas in the high pressure containers 12 is supplied to the fuel cell 11*a*, the control device 28 opens the first main stop valve 26 and the second main stop valve 30. Consequently, after the pressure thereof has been adjusted by the pressure regulating valve 32, the hydrogen gas, which has flowed from the high pressure containers 12 into the confluence pipe 24 via the first pipe 20 and the second pipe 22, is supplied to the fuel cell 11*a*, and is consumed in electrochemical reactions (power generating reactions) that take place in the fuel cell 11*a*. The mounting body (fuel cell vehicle 11) can be made to travel using the electrical power obtained by the electrochemical reactions.

Figure 5:
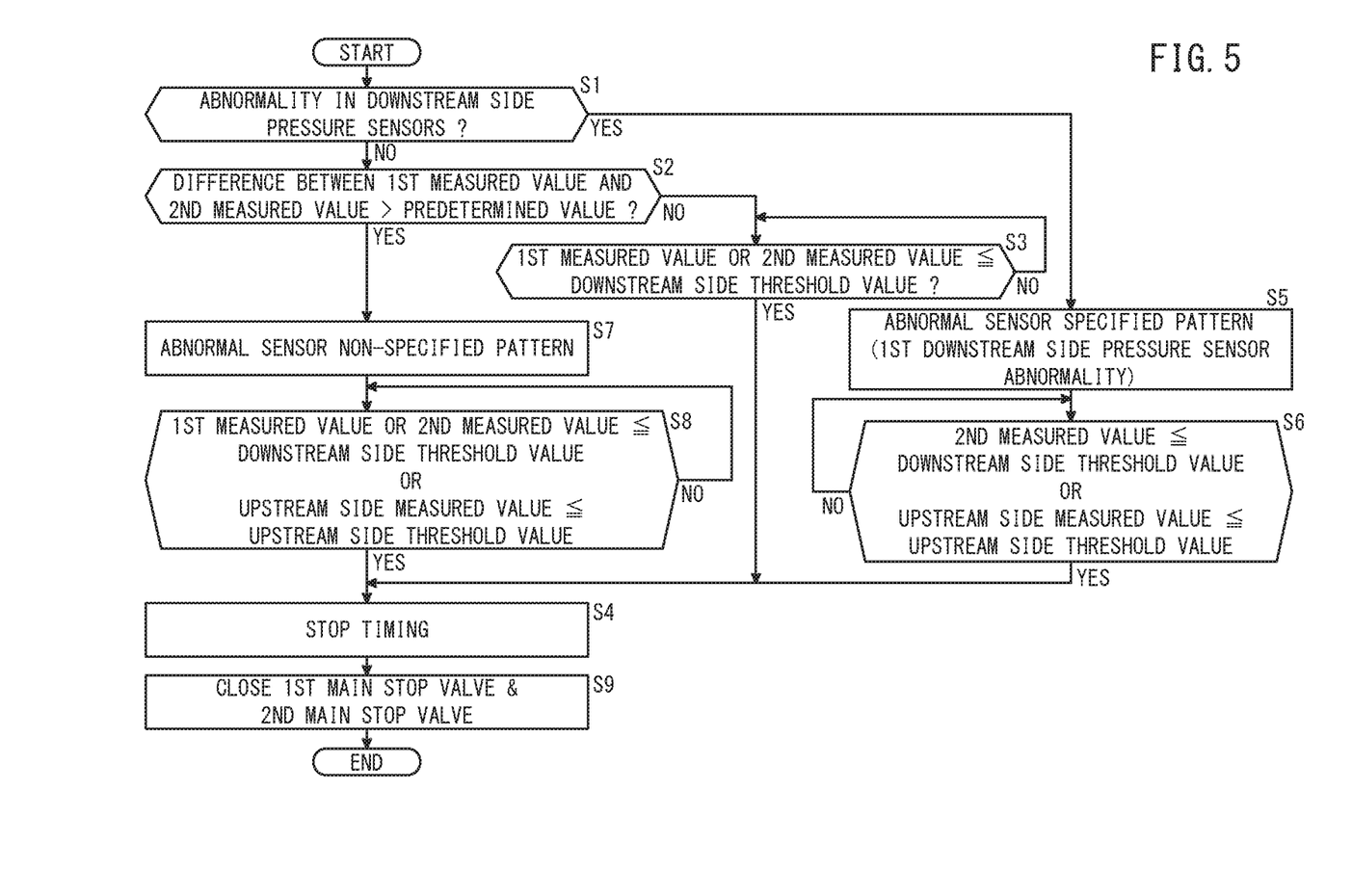
FIG. 5 is a flowchart for describing an example of a control method of the high pressure container system.

Next, while referring to FIG. 5, a description will be given concerning an example of a method of controlling the high pressure container system 10 according to the present embodiment. In such a control method, initially, a first abnormality detection process step is performed in step S1. In the first abnormality detection process step, it is detected whether or not an input made with respect to the control device 28 from the first downstream side pressure sensor 38 or the second downstream side pressure sensor 40 is abnormal.

In the first abnormality detection process step, in the case that an abnormality is not detected in the input from either one of the first downstream side pressure sensor 38 or the second downstream side pressure sensor 40 (step S1: NO), the process proceeds to step S2, whereupon a second abnormality detection process step is performed to determine whether or not a difference between the first measured value and the second measured value is greater than a predetermined value. In the second abnormality detection process step, in the case that a difference between the first measured value and the second measured value is less than or equal to the predetermined value (step S2: NO), the process proceeds to step S3 which is a normal time monitoring process step.

In the normal time monitoring process step, the internal pressure of the high pressure containers 12 is monitored with redundancy on the basis of the downstream side measured values. More specifically, the first measured value and the second measured value are compared respectively with the downstream side threshold value. In addition, in the case it is determined that both the first measured value and the second measured value are greater than the downstream side threshold value (step S3: NO), it is determined that the internal pressure of the high pressure containers 12 is greater than the lower limit set value, and the process of step S3 is repeated.

On the other hand, in the case it is determined in the normal time monitoring process step that the first measurement value or the second measurement value is less than or equal to the downstream side threshold value (step S3: YES), the process proceeds to step S4, and a determination is made that the stop timing has occurred at which discharging of the hydrogen gas from the high pressure containers 12 is to be stopped.

In the first abnormality detection process step of step S1, in the case it is detected that an input from the first downstream side pressure sensor 38 or the second downstream side pressure sensor 40 is abnormal (step S1: YES), the process proceeds to step S5. In step S5, a determination is made that the abnormality of the downstream side pressure sensors 36 is the abnormal sensor specified pattern, and the downstream side pressure sensor 36 whose input is abnormal (in the present embodiment, the first downstream side pressure sensor 38) is identified. Upon completion of step S5, the process proceeds to step S6 which is a first abnormal time monitoring process step.

In the first abnormal time monitoring process step, the internal pressure of the high pressure containers 12 is monitored with redundancy, on the basis of the second measured value of the second downstream side pressure sensor 40 in which an abnormality has not been detected, and the upstream side measured value. More specifically, the second measured value is compared with the downstream side threshold value, together with the upstream side measured value being compared with the upstream side threshold value. In the case it is determined that the second measured value is greater than the downstream side threshold value, and the upstream side measured value is greater than the upstream side threshold value (step S6: NO), a determination is made that the internal pressure of the high pressure containers 12 is greater than the lower limit set value, and the process of step S6 is repeated.

In the first abnormal time monitoring process step, in the case that the second measured value is determined to be less than or equal to the downstream side threshold value, or in the case that the upstream side measured value is determined to be less than or equal to the upstream side threshold value (step S6: YES), the process proceeds to step S4, whereupon a determination is made that the stop timing has occurred at which discharging of the hydrogen gas from the high pressure containers 12 is to be stopped.

In the second abnormality detection process step of step S2, in the case that a difference between the first measured value and the second measured value is greater than the predetermined value (step S2: YES), then in step S7, the abnormality of the downstream side pressure sensors 36 is determined to be the abnormal sensor non-specified pattern, and thereafter, the process proceeds to step S8 which is a second abnormal time monitoring process step.

In the second abnormal time monitoring process step, the internal pressure of the high pressure containers 12 is monitored with redundancy, on the basis of all of the first measured value, the second measured value, and the upstream side measured value. More specifically, the first measured value and the second measured value are compared respectively with the downstream side threshold value, together with the upstream side measured value being compared with the upstream side threshold value. In the case it is determined that both the first measured value and the second measured value are greater than the downstream side threshold value, and the upstream side measured value is greater than the upstream side threshold value (step S8: NO), a determination is made that the internal pressure of the high pressure containers 12 is greater than the lower limit set value, and the process of step S8 is repeated.

In the second abnormal time monitoring process step, in the case that any one of the first measured value and the second measured value is determined to be less than or equal to the downstream side threshold value, or in the case that the upstream side measured value is determined to be less than or equal to the upstream side threshold value (step S8: YES), the process proceeds to step S4, whereupon a determination is made that the stop timing has occurred at which discharging of the hydrogen gas from the high pressure containers 12 is to be stopped.

After having determined the occurrence of the stop timing in step S4, the process proceeds to step S9, whereupon the first main stop valve 26 and the second main stop valve 30 are placed in a closed state, and a further decrease in the internal pressure of the high pressure containers 12 is avoided. Upon completion of the process of step S9, the flowchart according to the present embodiment comes to an end.

As can be appreciated from the above, with the high pressure container system 10 according to the present embodiment, when the internal pressure of the high pressure containers 12 decreases and falls below the pressure regulated lower limit value of the pressure regulating valve 32, the internal pressure of the high pressure containers 12 and the fluid downstream from the pressure regulating valve 32 become the same pressure. Therefore, the internal pressure of the high pressure containers 12 within a low pressure region can be measured with redundancy by the plurality of downstream side pressure sensors 36 that are disposed downstream from the pressure regulating valve 32. Stated otherwise, at a normal time when an abnormality of the downstream side pressure sensors 36 is not detected, the internal pressure of the high pressure containers 12 in a low pressure region can be monitored in a state in which reliability is high, on the basis of the measured values of each of the downstream side pressure sensors 36.

Further, at an abnormal time when an abnormality is detected in any one of the downstream side pressure sensors 36, in the manner described above, the abnormal downstream side pressure sensor 36 is made redundant, owing to the presence of the upstream side pressure sensor 34, which is disposed separately from the downstream side pressure sensors 36 and upstream of the pressure regulating valve 32 in order to measure the internal pressure of the high pressure containers 12. More specifically, even when there is an abnormality, the internal pressure of the high pressure containers 12 can be measured while redundancy of the system is maintained. In this manner, on the basis of the actual measured values of the downstream side pressure sensors 36 and the upstream side pressure sensor 34, the internal pressure of the high pressure containers 12 in a low pressure region can be continuously monitored in a state in which reliability is high.

Therefore, in accordance with the high pressure container system 10, even in the case that an abnormality of the downstream side pressure sensors 36 is detected, operations of the high pressure container system 10 can be continued while reliability is maintained.

Stated otherwise, in the fuel cell vehicle 11 in which the high pressure container system 10 is mounted, even if an abnormality in any one of the downstream side pressure sensors 36 is detected, since it is unnecessary to perform an emergency stop or the like, merchantability can be improved.

Further, in the high pressure container system 10, as a configuration for maintaining redundancy when the downstream side pressure sensors 36 are abnormal, instead of increasing the number of downstream side pressure sensors 36, it is possible to utilize the upstream side pressure sensor 34 provided in the high pressure container system 10 in an application that differs from that of the downstream side pressure sensors 36. Therefore, redundancy of the downstream side pressure sensors 36 can be maintained at a low cost without increasing the number of components.

In the above-described high pressure container system 10, at the normal time, the control device 28 monitors the internal pressure of the high pressure containers 12 by comparing the measured values of the plurality of downstream side pressure sensors 36 with the downstream side threshold value, and when at least one measured value of the plurality of downstream side pressure sensors 36 is less than or equal to the downstream side threshold value, the control device 28 determines that the stop timing has occurred at which discharging of the fluid from the high pressure containers 12 is to be stopped. In this manner, at a normal time when an abnormality in the downstream side pressure sensors 36 is not detected, since the stop timing can be determined with redundancy by comparing the measured values of the plurality of downstream side pressure sensors 36 with the downstream side threshold value, it is possible to avoid with high reliability a situation in which the internal pressure of the high pressure containers 12 falls below the lower limit set value.

In the above-described high pressure container system 10, when any one of the plurality of downstream side pressure sensors 36 is identified as being abnormal, the abnormality detection unit 42 determines the abnormal time as an abnormal sensor specified pattern, and when any one of the plurality of downstream side pressure sensors 36 is not identified as being abnormal, the abnormality detection unit 42 determines the abnormal time as an abnormal sensor non-specified pattern. In this case, the internal pressure of the high pressure containers 12 can be monitored by a method corresponding to the type of abnormality of the downstream side pressure sensors 36. Accordingly, even at an abnormal time when an abnormality in the downstream side pressure sensors 36 is detected, operations of the high pressure container system 10 can be continued while reliability is maintained.

In the high pressure container system 10 according to the above-described embodiment, in the case that the abnormality detection unit 42 has determined that there is an abnormal sensor specified pattern, the control device 28 compares the measured values of the remaining downstream side pressure sensors 36 excluding the downstream side pressure sensor 36 that was identified as being abnormal with the downstream side threshold value, together with monitoring the internal pressure of the high pressure containers 12 by comparing the measured value of the upstream side pressure sensor 34 with the upstream side threshold value, and when the measured values of the remaining downstream side pressure sensors 36 are less than or equal to the downstream side threshold value, or when the measured value of the upstream side pressure sensor 34 is less than or equal to the upstream side threshold value, the control device 28 determines that the stop timing has occurred.

In this case, the stop timing can be determined with redundancy, by comparing the measured values of the downstream side pressure sensors 36 in which abnormalities have not been detected with the downstream side threshold value, and by comparing the upstream side measured value with the upstream side threshold value. Accordingly, even at an abnormal time when there is an abnormality in the downstream side pressure sensors 36, while reliability is maintained, it is still possible to avoid a situation in which the internal pressure of the high pressure containers 12 falls below the lower limit set value.

In the above-described high pressure container system 10, in the case that the abnormality detection unit 42 has determined that there is an abnormal sensor non-specified pattern, the control device 28 compares the measured values of all of the downstream side pressure sensors 36 with the downstream side threshold value, together with monitoring the internal pressure of the high pressure containers 12 by comparing the measured value of the upstream side pressure sensor 34 with the upstream side threshold value, and when at least one measured value of the downstream side pressure sensors 36 is less than or equal to the downstream side threshold value, or when the measured value of the upstream side pressure sensor 34 is less than or equal to the upstream side threshold value, the control device 28 determines that the stop timing has occurred.

In the foregoing manner, even in the case that it is not specified which of the plurality of downstream side pressure sensors 36 is abnormal, within the plurality of downstream side pressure sensors 36, there is included a downstream side pressure sensor 36 for which an abnormality is not detected. Therefore, the stop timing can be determined while redundancy is maintained, by performing a comparison between the measured values of all of the downstream side pressure sensors 36 and the downstream side threshold value, and a comparison between the upstream side measured value and the upstream side threshold value. Consequently, even at an abnormal time when there is an abnormality in the downstream side pressure sensors 36, while a decrease in reliability is suppressed, it is possible to avoid a situation in which the internal pressure of the high pressure containers 12 falls below the lower limit set value.

In the above-described high pressure container system 10, a measurement range of the upstream side pressure sensor 34 is greater than a measurement range of the downstream side pressure sensors 36, the upstream side threshold value is set to be greater than the lower limit set value, by a size corresponding to a measurement error range of the upstream side pressure sensor 34, the downstream side threshold value is set to be greater than the lower limit set value, by a size corresponding to a measurement error range of the downstream side pressure sensors 36, and the upstream side threshold value is set to be greater than the downstream side threshold value.

In this case, the internal pressure of the high pressure containers 12 in a high pressure region can be suitably measured by the upstream side pressure sensor 34. Further, the internal pressure of the high pressure containers 12 in a low pressure region can be measured with high accuracy by the downstream side pressure sensors 36, and consequently, it is possible to increase reliability when the internal pressure of the high pressure containers 12 is monitored by the high pressure container system 10.

Further, the upstream side pressure sensor 34 in which the measurement range is large has a larger measurement error in comparison with that of the downstream side pressure sensors 36. By also setting the downstream side threshold value and the upstream side threshold value in such a manner, respectively, in accordance with the sizes of each of the measurement errors of the upstream side pressure sensor 34 and the downstream side pressure sensors 36, it becomes possible to increase reliability when the internal pressure of the high pressure containers 12 is monitored by the high pressure container system 10.

In the above-described high pressure container system 10, each of the high pressure containers 12 includes the liner 14 made of resin through which the fluid is supplied and discharged, and the reinforced layer 16 made of the fiber-reinforced plastic that covers the outer surface of the liner 14. In accordance with such a high pressure container system 10, as described above, it is possible to monitor with high reliability whether the internal pressure of the high pressure containers 12 has fallen below the lower limit set value. Therefore, in accordance with the high pressure container system 10, by monitoring the internal pressure of the high pressure containers 12 equipped with the resin liner 14 and the reinforced layer 16, it is possible to effectively suppress a situation in which the liner 14 and the reinforced layer 16 undergo pealing or separate from one another, and the liner 14 undergoes buckling or the like to protrude toward the interior thereof.

The present invention is not particularly limited to the above-described embodiments, and various modifications can be made thereto within a range that does not deviate from the essence and gist of the present invention.

For example, the supply and discharge flow passage is not limited to being constituted from the first pipe 20, the second pipe 22, and the confluence pipe 24, and various configurations can be adopted in which the hydrogen gas (fluid) accommodated within the high pressure containers 12 is supplied to the downstream side via the pressure regulating valve 32.

What is claimed is:

1. A high pressure container system configured to supply a fluid accommodated in a high pressure container to a downstream side via a pressure regulating valve, the high pressure container system comprising:

an upstream side pressure sensor configured to measure an internal pressure of the high pressure container upstream of the pressure regulating valve;

a plurality of downstream side pressure sensors configured to measure a pressure of the fluid downstream of the pressure regulating valve, wherein the pressure is a function of one or more measured values from the plurality of downstream side pressure sensors; and a control device having a central processing unit and a memory, wherein the control device is configured to monitor that the internal pressure of the high pressure container does not fall below a lower limit set value in a case where the internal pressure of the high pressure container decreases until reaching the pressure of the fluid downstream of the pressure regulating valve;

wherein the control device comprises an abnormality detection unit configured to detect a malfunction of the downstream side pressure sensors, wherein in a case where the malfunction of the downstream side pressure sensors is not detected, the control device performs the monitoring of the internal pressure of the high pressure container on the basis of the pressure, of the fluid downstream of the pressure regulating valve, measured by the plurality of downstream side pressure sensors, wherein in a case where it is detected that any one of the downstream side pressure sensors is malfunctioning, the control device performs the monitoring of the internal pressure of the high pressure container on the basis of the pressure, of the fluid downstream of the pressure regulating valve, measured by the plurality of downstream side pressure sensors and on the basis of the internal pressure measured by the upstream side pressure sensor, and wherein based on the monitoring by the control device of the internal pressure of the high pressure container, the control device executes an actuation of a stop valve fluidly coupled to the high pressure container.

2. The high pressure container system according to claim 1, wherein:

at a normal time, the control device monitors the internal pressure of the high pressure container by comparing the measured values of the plurality of downstream side pressure sensors with a downstream side threshold value; and when at least one measured value of the plurality of downstream side pressure sensors is less than or equal to the downstream side threshold value, the control device determines that a stop timing has occurred at which discharging of the fluid from the high pressure container is to be stopped, and wherein the actuation of the stop valve is executed in response to this determining.

3. The high pressure container system according to claim 2, wherein:

when any one of the plurality of downstream side pressure sensors is identified as malfunctioning, the abnormality detection unit determines an abnormal time as corresponding to a malfunctioning specified pattern; and when any one of the plurality of downstream side pressure sensors is not identified as malfunctioning, the abnormality detection unit determines the abnormal time as corresponding to a malfunctioning sensor non-specified pattern.

4. The high pressure container system according to claim 3, wherein:

in the case that the abnormality detection unit has determined that there is the malfunctioning sensor specified pattern, the control device compares the measured values of the remaining downstream side pressure sensors excluding the downstream side pressure sensor that was identified as malfunctioning with the downstream side threshold value, together with monitoring the internal pressure of the high pressure container by comparing the measured value of the upstream side pressure sensor with an upstream side threshold value; and when the measured values of the remaining downstream side pressure sensors are less than or equal to the downstream side threshold value, or when the measured value of the upstream side pressure sensor is less than or equal to the upstream side threshold value, the control device determines that the stop timing has occurred.

5. The high pressure container system according to claim 4, wherein:

in the case that the abnormality detection unit has determined that there is the malfunctioning sensor non-specified pattern, the control device compares the measured values of all of the downstream side pressure sensors with the downstream side threshold value, together with monitoring the internal pressure of the high pressure container by comparing the measured value of the upstream side pressure sensor with the upstream side threshold value; and when at least one measured value of the downstream side pressure sensors is less than or equal to the downstream side threshold value, or when the measured value of the upstream side pressure sensor is less than or equal to the upstream side threshold value, the control device determines that the stop timing has occurred.

6. The high pressure container system according to claim 4, wherein:

a measurement range of the upstream side pressure sensor is greater than a measurement range of the downstream side pressure sensors;

the upstream side threshold value is set to be greater than the lower limit set value, by a size corresponding to a measurement error range of the upstream side pressure sensor;

the downstream side threshold value is set to be greater than the lower limit set value, by a size corresponding to a measurement error range of the downstream side pressure sensors; and the upstream side threshold value is greater than the downstream side threshold value.

7. A high pressure container system configured to supply a fluid accommodated in a high pressure container to a downstream side via a pressure regulating valve, the high pressure container system comprising:

an upstream side pressure sensor configured to measure an internal pressure of the high pressure container upstream of the pressure regulating valve in order to calculate at least a remaining amount of fluid inside the container;

two downstream side pressure sensors configured to measure the pressure of the fluid downstream of the pressure regulating valve, wherein the pressure is a function of one or more measured values from the two downstream side pressure sensors; and a control device having a central processing unit and a memory, wherein the control device is configured to monitor that the internal pressure of the high pressure container does not fall below a lower limit set value in a case where the internal pressure of the high pressure container decreases until reaching a pressure of the fluid downstream of the pressure regulating valve;

wherein the control device comprises an abnormality detection unit configured to detect a malfunction of either one of the two downstream side pressure sensors, wherein in a case where the malfunction of the two downstream side pressure sensors is not detected, the control device monitors the internal pressure of the high pressure container using the pressure, of the fluid downstream of the pressure regulating value, measured by the two downstream side pressure sensors, wherein in a case where it is detected that either one of the two downstream side pressure sensors is malfunctioning, the control device monitors the internal pressure of the high pressure container using the pressure, of the fluid downstream of the pressure regulating valve, that is measured by at least one of the two downstream side pressure sensors and the internal pressure measured by the upstream side pressure sensor, and wherein based on the monitoring by the control device of the internal pressure of the high pressure container, the control device executes an actuation of a stop valve fluidly coupled to the high pressure container.

8. The high pressure container system according to claim 1, wherein the high pressure container comprises a liner made of resin through which the fluid is supplied and discharged, and a reinforced layer made of fiber-reinforced plastic covering an outer surface of the liner.

9. A fuel cell vehicle equipped with a high pressure container system, the high pressure container system being configured to supply a fluid accommodated in a high pressure container to a downstream side via a pressure regulating valve, the fuel cell vehicle comprising:
an upstream side pressure sensor configured to measure an internal pressure of the high pressure container upstream of the pressure regulating valve;
a plurality of downstream side pressure sensors configured to measure a pressure of the fluid downstream of the pressure regulating valve, wherein the pressure is a function of one or more measured values from the plurality of downstream side pressure sensors; and
a control device having a central processing unit and a memory, wherein the control device is configured to monitor that the internal pressure of the high pressure container does not fall below a lower limit set value, when the internal pressure of the high pressure container decreases until reaching the pressure of the fluid downstream of the pressure regulating valve;
wherein the control device comprises an abnormality detection unit configured to detect a malfunction of the downstream side pressure sensors,
wherein in a case where the malfunction of the downstream side pressure sensors is not detected, the control device monitors the internal pressure of the high pressure container on the basis of the pressure, of the fluid downstream of the pressure regulating value, measured by the plurality of downstream side pressure sensors,
wherein in a case where it is detected that any one of the downstream side pressure sensors is malfunctioning, the control device monitors the internal pressure of the high pressure container on the basis of the pressure, of the fluid downstream of the pressure regulating value measured by the plurality of downstream side pressure sensors and the internal pressure measured by the upstream side pressure sensor, and
wherein based on the monitoring by the control device of the internal pressure of the high pressure container, the control device executes an actuation of a stop valve fluidly coupled to the high pressure container.

10. The fuel cell vehicle according to claim 9, wherein:
at a normal time, the internal pressure of the high pressure container is measured by comparing the measured values of the plurality of downstream side pressure sensors with a downstream side threshold value; and
when at least one measured value of the plurality of downstream side pressure sensors is less than or equal to the downstream side threshold value, a determination is made that a stop timing has occurred at which discharging of the fluid from the high pressure container is to be stopped, and
wherein the actuation of the stop valve is executed in response to this determining.

11. The fuel cell vehicle according to claim 10, wherein:
when any one of the plurality of downstream side pressure sensors is identified as malfunctioning, the abnormality detection unit determines an abnormal time as corresponding to a malfunctioning sensor specified pattern; and
when any one of the plurality of downstream side pressure sensors is not identified as malfunctioning, the abnormality detection unit determines the abnormal time as corresponding to a malfunctioning sensor non-specified pattern.

12. The fuel cell vehicle according to claim 11, wherein:
in the case that the abnormality detection unit has determined that there is a malfunctioning sensor specified pattern, the control device compares the measured values of the remaining downstream side pressure sensors excluding the downstream side pressure sensor that was identified as malfunctioning with the downstream side threshold value, together with monitoring the internal pressure of the high pressure container by comparing the measured value of the upstream side pressure sensor with an upstream side threshold value; and
when the measured values of the remaining downstream side pressure sensors are less than or equal to the downstream side threshold value, or when the measured value of the upstream side pressure sensor is less than or equal to the upstream side threshold value, the control device determines that the stop timing has occurred.

13. The fuel cell vehicle according to claim 12, wherein:
in the case that the abnormality detection unit has determined that there is a malfunctioning sensor non-specified pattern, the control device compares the measured values of all of the downstream side pressure sensors with the downstream side threshold value, together with monitoring the internal pressure of the high pressure container by comparing the measured value of the upstream side pressure sensor with the upstream side threshold value; and
when at least one measured value of the downstream side pressure sensors is less than or equal to the downstream side threshold value, or when the measured value of the upstream side pressure sensor is less than or equal to the upstream side threshold value, the control device determines that the stop timing has occurred.

14. The fuel cell vehicle according to claim 12, wherein:
a measurement range of the upstream side pressure sensor is greater than a measurement range of the downstream side pressure sensors;
the upstream side threshold value is set to be greater than the lower limit set value, by a size corresponding to a measurement error range of the upstream side pressure sensor;
the downstream side threshold value is set to be greater than the lower limit set value, by a size corresponding to a measurement error range of the downstream side pressure sensors; and
the upstream side threshold value is greater than the downstream side threshold value.

15. The fuel cell vehicle according to claim 9, wherein the high pressure container comprises a liner made of resin through which the fluid is supplied and discharged, and a reinforced layer made of fiber-reinforced plastic covering an outer surface of the liner.

* * * * *